United States Patent Office
2,842,572
Patented July 8, 1958

2,842,572

ORGANIC COMPOUNDS AND PROCESS

Milton E. Herr and George B. Spero, Kalamazoo, Mich., assignors to The Upjohn Company, Kalamazoo, Mich., a corporation of Michigan No Drawing. Application May 27, 1957
Serial No. 661,626

7 Claims. (Cl. 260—397.45)

The present invention relates to new steroid compounds and is more particularly concerned with 6-methyl-17α-alkyl-11β,17β-dihydroxy-4-androsten-3-one, 6-methyl-17α-alkyl-17β-hydroxy-4-androstene-3,11-dione, 17β-acylates thereof and a process for the production therefor.

The novel steroids and the process for the production therefor are represented by the following sequence of formulae:

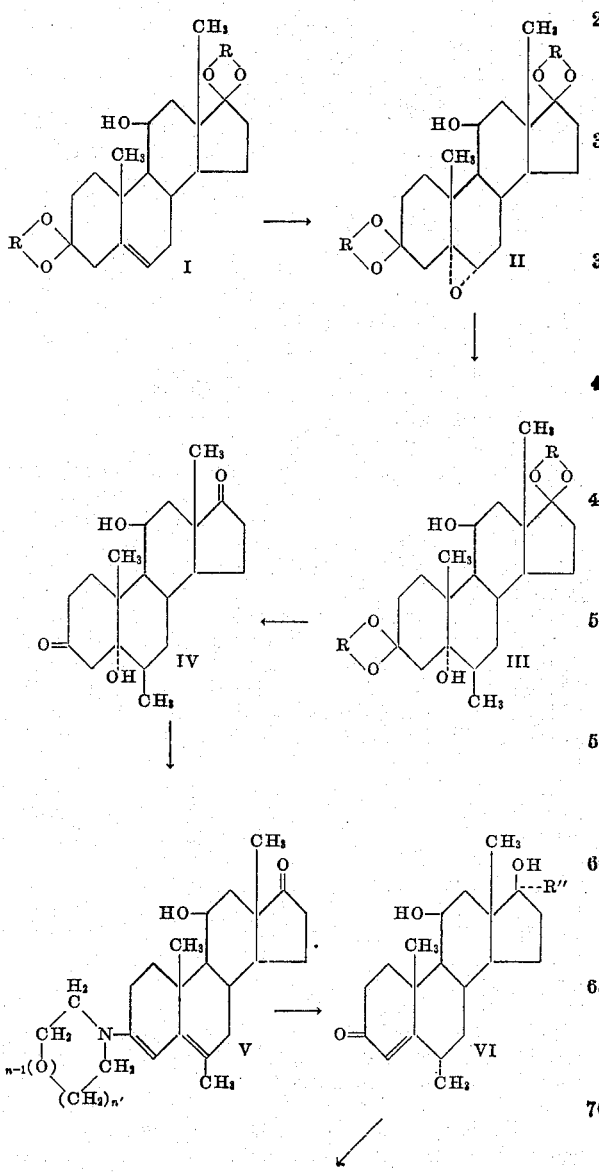

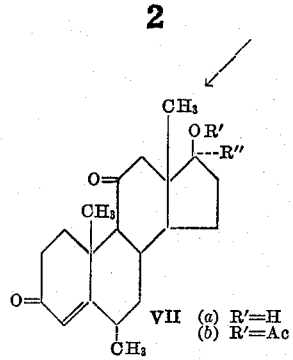

wherein R is an alkylene radical containing not more than eight carbon atoms, inclusive, and the attaching oxygen carbon bonds are separated by a chain of at least two and not more than three carbon atoms; wherein $n$ and $n'$ are whole numbers from one to two, inclusive, wherein R' is selected from the group consisting of hydrogen and the acyl radical Ac of a hydrocarbon carboxylic acid containing from one to eight carbon atoms, inclusive, and wherein R" is selected from the group consisting of alkyl radicals containing less than five carbon atoms and phenyl.

The process of the present invention comprises: treating an 11β-hydroxy-5-androstene-3,17-dione 3,17-bis-(alkylene ketal) (I) with a peracid, such as peracetic or perbenzoic to obtain the corresponding 5,6-oxido-11β-hydroxyandrostane-3,17-dione 3,17-bis-(alkylene ketal) (II); treating the thus obtained 5,6-oxido-11β-hydroxy-androstane-3,17-dione 3,17-bis-(alkylene ketal) with a methyl metal compound, preferably a methyl metal halide, and specifically a methyl Grignard reagent to give the corresponding 5α,11β-dihydroxy-6β-methylandrostane-3,17-dione 3,17-bis-(alkylene ketal) (III); hydrolyzing the thus obtained 5α,11β-dihydroxy-6β-methylandrostane-3,17-dione 3,17-bis-(alkylene ketal) with an acid, e. g., dilute sulfuric or dilute hydrochloric acid to give the corresponding 5α,11β-dihydroxy-6β-methylandrostane-3,17-dione (IV); treating the thus obtained 5α,11β-dihydroxy-6β-methylandrostane-3,17-dione with a cyclic, secondary amine, such as pyrrolidine, morpholine, piperidine, homomorpholine, or the like, to obtain the corresponding 3-(N-cyclic tertiaryamino)-6-methyl-11β-hydroxy-3,5-androstadien-17-one (V); treating the thus produced enamine (V) with a Grignard reagent such as methyl magnesium bromide, methyl magnesium iodide, ethyl, propyl, butyl magnesium bromide or iodide produces the coresponding 6-methyl-11β-hydroxy-17α-alkyltestosterone (VI); oxidizing a 6-methyl-11β-hydroxy-17α-alkyltestosterone with chromic acid in acetic acid or in a heterogeneous phase system such as benzene and an aqueous, acidified solution of sodium or potassium dichromate produces the corresponding 6-methyl-11-keto-17α-alkyltestosterone of Formula VIIa. Esterification of 6-methyl-11-keto-17α-alkyltestosterone as shown in Example 10 yields the corresponding 6-methyl-11-keto-17α-alkyltestosterone 17β-acylate (VIIb). Using in the second step of the reaction series other metal halides, dialkyl cadmium compounds, alkyl and phenyl cadmium halides, aryl and alkyl calcium halides, such as phenyl calcium iodide and especially alkyl and phenyl Grignards such as ethyl, propyl, butyl, phenyl magnesium bromide, or iodide results in other 5α,-11β-dihydroxy-6-alkyl- or 6-arylandrostane-3,17-dione 3,-17-bis-(alkylene ketals) which by the subsequent steps are converted to the corresponding 6,17-dialkyl- or 6,17-diaryl-11β-hydroxytestosterone, and the 6,17-dialkyl- or 6,17-diaryl-11-ketotestosterone.

Hydrolyzing in aqueous alcohol the 3-(N-cyclic tertiary-amino)-6-methyl-11β-hydroxy-3,5-androstadien-17-one (V) with aqueous ethanol, or other aqueous alkanol results in the corresponding 6-methyl-11β-hydroxy-4-androstene-3,17-dione.

It is an object of the instant invention to provide 6,17-dimethyl-11β-hydroxytestosterone, 6,17-dimethyl-11-ketotestosterone and other 6,17-dialkyl- and 6,17-diaryl-11-oxygenated testosterones. It is another object of the instant invention to provide a process for the production of 6,17-dialkyl- and diaryl-11-oxygenated testosterones. Other objects of this invention will be apparent to those skilled in the art to which this invention pertains.

The new compounds, 6,17-dimethyl-11β-hydroxytestosterone, 6,17-dimethyl-11-ketotestosterone as well as other 6,17-dialkyl and diaryl-11β-hydroxytestosterones and 11-ketotestosterones are compounds of high anabolic and low androgenic activity. These compounds are, therefore, useful to produce increase of protein anabolism in patients with impaired nitrogen metabolism, especially in senile individuals without causing undesirable side effects such as virilization in women or increase of libido in men. The compounds have also central nervous systemic action, especially tranquillizing, sedative, hypnotic, and sedative potentiating activities. They are particularly useful when administered by injection especially as suspensions in oil or aqueous vehicles.

The 6α,17α-dimethyl-11β-hydroxytestosterone and 6α,17α-dimethyl-11-ketotestosterone may be also used as sedative or antihypertensive agents in oral preparations, as tablets together with Evipal Sodium (hexyl barbital sodium). For symptomatic treatment in senile patients to increase protein anabolism, 6α,17α-dimethyl-11β-hydroxytestosterone and 6α,17β-dimethyl-11-ketotestosterone may be used in either oral or injectable form. The 6α,17α-dimethyl-11β-hydroxytestosterone is also an important intermediate in the production of the 9α-halo analogs, especially the 6α,17α-dimethyl-9α-fluoro-11β-hydroxytestosterone and the 11-keto-analogs thereof as shown in detail in Examples 13 and 14. The 6α,17α-dimethyl-9α-fluoro-11β-hydroxytestosterone and the 11-keto analogue thereof is a particularly potent anabolic agent with a favorable protein anabolic androgenic ratio and thus useable wherever an increase in the protein metabolism is desirable in patients.

The starting materials of the instant invention are the 3,17-diketals of 11β-hydroxy-4-androstene-3,17-dione, especially the 11β-hydroxy-5-androstene-3,17-dione 3,17-bis-(ethylene ketal), prepared for example as shown by Bernstein et al., J. Org. Chem. 18, 1166, 1953. While the ethylene diketal is the preferred ketal of 11β-hydroxy-4-androsten-3,17-dione, because obtained in high yield with the least amount of difficulty, other ketals can be used such as propylene, butylene or pentylene ketals, and the like. The preparation of such ketals is made by known and analogous methods, i. e., heating 11β-hydroxy-4-androstene-3,17-dione with an alkylene diol at reflux temperature in the presence of an acid catalyst, such as toluenesulfonic acid to obtain the desired 3,17-bis-(alkylene ketal) of 11β-hydroxy-4-androstene-3,17-dione.

In carrying out the process of the present invention the selected 11β-hydroxy-5-androstene-3,17-dione 3,17-bis-(alkylene ketal) is dissolved in an organic solvent such as chloroform, methylene chloride, ethylene dichloride, carbon tetrachloride, benzene, toluene, ethyl acetate, or the like, and treated with an organic peracid such as performic, peracetic, perpropionic, perbenzoic, monoperiphthalic acid or other organic peracids. The reaction is generally carried out at low temperature such as between minus ten and plus fifteen degrees centigrade, however, higher temperatures such as room temperature and up to forty degrees centigrade are operable. In the preferred embodiment of the instant invention temperatures between zero and ten degrees centigrade, a chlorinated hydrocarbon such as chloroform or methylene dichloride and peracetic or perbenzoic acid are used. The peracid is used in a quantity usually from ten to twenty percent above the quantity theoretically required up to five times the quantity required by theory.

At the end of the reaction the excess acid is neutralized with a base, preferably with sodium or potassium carbonate or a neutralizing agent such as sodium or potassium bicarbonate, washed with water and the thus obtained 5α,6α-oxido-11β-hydroxyandrostane-3,17-dione 3,17-bis-(alkylene ketal) recovered from the organic layer by evaporation. Recrystallization from organic solvents such as methanol, ethanol, Skellysolve B hexanes, heptanes, benzene, toluene, or the like, provides pure 5α,6α-oxido-11β-hydroxyandrostane-3,17-dione 3,17-bis-(alkylene ketal).

The thus obtained 5α,6α-oxido-11β-hydroxyandrostane-3,17-dione 3,17-bis-(alkylene ketal), dissolved in a suitable organic solvent, such as tetrahydrofuran, benzene, ethyl ether, propyl ether, or the like, with the higher boiling solvents such as tetrahydrofuran and benzene preferred, is reacted with a Grignard reagent such as methyl, ethyl, propyl, butyl, pentyl, hexyl, or aryl magnesium halide or other alkylating or arylating agent, preferably with a methyl metal compound especially a methyl metal halide such as methyl magnesium chloride, bromide, or iodide, methyl lithium, dimethyl cadmium, or the like. Other useful alkyl or aryl metal compounds and alkyl- or aryl metal halides include the ethyl, propyl, butyl, pentyl, hexyl, phenyl, benzyl magnesium chloride, lithium, sodium or potassium compounds, the phenyl calcium iodide, the alkyl cadmium halides and dialkyl cadmium compounds, wherein the alkyl group has from one to six carbon atoms, inclusive, and the like, with the methyl magnesium bromide and methyl magnesium iodide preferred. In the preferred embodiment of the instant invention the reaction is started at room temperature or below, temperatures between zero and thirty degrees centigrade being preferred. After the addition of the methyl magnesium halide or other methyl metal halides, the temperature is raised and the reaction mixture is heated to about reflux temperature for a period of from one to 48 hours. In general, a large excess of the Grignard reagent (ten to 500 mole equivalents) is used. The temperature for the Grignard addition reaction is generally between 25 to 100 degrees centigrade, with the preferred range of from fifty degrees centigrade to the reflux temperature of the mixture.

After the reaction is terminated, the reaction mixture is decomposed using neutral rather than acidic conditions. In the preferred embodiment of the invention, the reaction mixture is mixed with an aqueous saturated ammonium chloride solution, cooled with ice, and the resulting mixture is stirred for a period of several minutes to one hour. The aqueous and organic layers are then separated from each other. The organic phase is washed, dried, and evaporated to give the crude 5α,11β-dihydroxy-6β-methylandrostane-3,17-dione 3,17-bis-(alkylene ketal), which can be purified by conventional procedures, such as recrystallization and/or chromatography with organic solvents.

The thus obtained 5α,11β-dihydroxy-6β-methylandrostane-3,17-dione 3,17-bis-(alkylene ketal) is thereupon hydrolyzed in an acidified water-miscible solvent, for example, oxygenated organic solvent such as ketones and alkanols, e. g., methanol, ethanol, tertiary butyl alcohol and acetone, propyl alcohol, isopropyl alcohol, or dioxane, formamide, or the like, and an organic or inorganic acid, such as sulfuric acid, hydrochloric acid, formic, acetic, propionic, and toluenesulfonic acid may be used. Also an aqueous solution of an organic acid may be used as both the reagent and solvent for the hydrolysis. Aqueous formic or acetic acid is especially useful for this hydrolysis. The thus obtained mixture is warmed at fifty to 100 degrees centigrade and thereafter the acidity decreased either by diluting with water or by neutralizing with a base such as sodium carbonate, potassium carbonate, sodium hydroxide, other alkali solutions or a bicarbonate such as sodium or potassium bicarbonate, and is then concentrated to give 5α,11β-dihydroxy-6β-methylandrostane-3,17-dione as a crude product. The crude product can be purified by recrystallization from organic solvents such as acetone, ethyl acetate, Skellysolve B hexanes, methanol, tertiary butyl alcohol, ether, or the like, or mixtures thereof to give pure 5α,11β-dihydroxy-6β-methylandrostane-3,17-dione.

The thus obtained 5α,11β-dihydroxy-6β-methylandrostane-3,17-dione is thereupon dehydrated and simultaneously converted to the corresponding 3-enamine, 3-(N-cyclic tertiaryamino) - 6 - methyl - 11β - hydroxy - 3,5 - androstadien-17-one. This is achieved by treating the 5α,11β-dihydroxy-6β-methylandrostane-3,17-dione at elevated temperatures in solution with a cyclic secondary amine.

The secondary amines generally used are pyrrolidine, morpholine, piperidine, homomorpholine, or the like, with pyrrolidine preferred. As solvents can be used alkanols, such as methyl alcohol, ethyl, propyl, isopropyl, butyl, hexyl, octyl alcohol, or the like, or benzene, toluene, dioxane, tetrahydrofuran, or the like. Preferred are water-miscible solvents such as methanol or ethanol since in this case no provision to eliminate the water, produced in the reaction, is necessary. As temperature of reaction, the range between fifty degrees centigrade and the refluxing point of the mixture are generally used. However, the reaction also takes place at lower temperatures such as between room temperature (about 25 degrees centigrade) and fifty degrees centigrade. The reagent is generally used in an amount equal to the theoretical amount required and up to three or four times the theoretical. An excess of about one and one-half to three times the theoretical amount required is generally preferred. The time of reaction depends upon the reaction condition, especially the solvent and the temperature used. In hot alcohol and hot methanol or ethanol, reaction begins immediately and is almost completed upon cooling of the reaction mixture to room temperature. In benzene the reaction time is usually held between fifteen minutes and two hours at refluxing temperatures. Since the reaction product is generally insoluble in the solvent, the product at the termination of the reaction is recovered by filtration, purified by washing and recrystallization to give the pure 3-(N-tertiarycyclic amino)-6-methyl-11β-hydroxy-3,5-androstadien-17-one.

The thus obtained 3-(N-tertiarycyclic amino)-6-methyl-11β-hydroxy-3,5-androstadien-17-one is alkylated on the 17-position either with a Grignard reagent or with an olefin or acetylenic compound in the presence of a base catalyst such as potassium or sodium isopropoxide, tertiary butoxide, and the like. As a Grignard reagent especially methyl, ethyl, and propyl magnesium bromide or iodide are used in either benzene or tetrahydrofuran solution. As other conditions, such as temperature, reaction time, or the like, any conventional condition commonly used in Girnard reactions can be used here. At the end of the reaction, the Grignard addition product is decomposed with water using generally more or less neutral conditions. Without isolating and purifying the thus produced 3-(N-tertiarycyclic amino)-6,17α-dimethyl-11β-hydroxy-3,5-androstadiene-17β-ol is then hydrolyzed under either acidic or basic conditions, preferably in a buffered solution, for example, sodium or potassium acetate and sodium or potassium hydroxide or acetic acid in the presence of the sodium or potassium acetate. Hydrolysis of the enamine group can be made at room temperature, but preferably is done at elevated temperature such as the reflux temperature of the mixture. After termination of the reaction, the material, 6,17-dimethyl-11β,17β-dihydroxy-4-androsten-3-one, is isolated in conventional manner, for example, in case of solid material by filtration or, if no solid material separates from the mixture, by extraction with water-immiscible solvents such as methylene dichloride, chloroform, ether, benzene, or the like.

If in the two alkylation reactions other than methylating agents were used or even phenyl Grignards, other 6,17-dialkyl-, 6,17-diaryl, or mixed 6,17-di-substituted 11β,17-dihydroxy-4-androstene-3-ones are obtained.

The thus obtained 6,17-dimethyl-, 6,17-dialkyl- or 6,17-diaryl-11β-hydroxytestosterone is converted to the corresponding 6,17-dialkyl or 6,17-diaryl-11-keto-testosterone by oxidation with chromic acid, or other oxidants. Chromic and acetic acid or chromic acid and pyridine are preferred oxidants. The thus obtained 6,17-dialkyl- or 6,17-diaryl-11-ketotestosterone is isolated from the reaction mixture in a conventional manner, that is, by filtration, if a precipitate can be obtained, after adding water, or by extraction with water-immiscible solvents such as ether, chloroform, methylene chloride, carbon tetrachloride, and the like, when the product is not suitable for filtration.

The following examples are illustrative of the product and the process of the present invention and are not to be construed as limiting.

*Example 1.—5,6-oxido-11β-hydroxyandrostane-3,17-dione 3,17-bis-(ethylene ketal)*

A solution of 20.48 grams of 11β-hydroxy-5-androstene-3,17-dione 3,17-bis-(ethylene ketal) in 400 milliliters of chloroform was added with stirring to an ice cooled mixture of forty milliliters of forty percent peracetic acid and four grams of sodium acetate. The mixture was stirred in an ice-water bath for 105 minutes and 400 milliliters of chloroform was then added. Thereafter 400 milliliters of saturated sodium bicarbonate solution was added and after mixing thoroughly the organic layer was separated from the aqueous layer. The organic layer was thereupon washed twice with water, dried over sodium sulfate and concentrated to 100 milliliters on a steam bath. Thereafter 100 milliliters of benzene was added, the mixture was concentrated and cooled at room temperature to give 14.42 grams of crude 5,6-oxido-11β-hydroxyandrostane-3,17-dione 3,17-bis-(ethylene ketal) of melting point 226–232 degrees centigrade. A sample was recrystallized from acetone to give pure 5,6-oxido-11β-hydroxyandrostane-3,17-dione 3,17-bis-(ethylene ketal) of melting point 225 to 230 degrees centigrade and rotation $[\alpha]_D$ of 58 degrees in chloroform.

*Analysis.*—Calcd. for $C_{23}H_{34}O_6$: C, 67.95; H, 8.43. Found: C, 68.16; H, 8.80.

In the same manner given in Example 1, treating other bis-alkylene ketals with peracetic acid or other peracid, usually at low temperatures gives the corresponding 5,6-oxido-11β-hydroxyandrostane-3,17-dione 3,17-bis-(alkylene ketal). Representative such diketals comprise the 5,6-oxido-11β-hydroxyandrostane-3,17-dione 3,17-bis-(1,3-propylene ketal), 3,17-bis-(2,3-butylene ketal), 3,17-bis-(1,2-butylene ketal), 3,17-bis-(butylene 1,3-ketal), and the like.

*Example 2.—5α,11β-dihydroxy-6β-methylandrostane-3,17-dione 3,17-bis-(ethylene ketal)*

A solution of 4.07 grams (0.01 mole) of 5,6-oxido-11β-hydroxyandrostane-3,17-dione 3,17-bis-(ethylene ketal), dissolved in 250 milliliters of tetrahydrofuran, was added under a nitrogen atmosphere during a period of ten minutes with mechanical stirring to a mixture of fifty milliliters of four molar methyl magnesium bromide in diethyl ether. The mixture was then distilled until the vapor temperature at the head of the distilling column was sixty degrees centigrade at which point the downward condenser was replaced with a reflux condenser protected with a calcium chloride tube. The mixture was thereupon heated at reflux for a period of seventeen hours whereafter the reaction mixture was cooled to room temperature and then in an ice-water bath. With the stirrer operating, 200 milliliters of benzene was added and then 100-milliliters of water cautiously from a dropping funnel. The liquid phase was decanted from the sludge residue into a separatory funnel. The residue was washed with two 100-milliliter portions of benzene which were in turn added to the before-obtained liquid phase. The combined liquid phase was washed with two 100-milliliter portions of water, 100 milliliters of ammonium chloride solution, 100 milliliters of water and dried over sodium sulfate. The solvent was removed under reduced pressure to leave a solid residue and the solid residue was crystallized from dilute acetone to give 3.43 grams (81 percent) of 5α,11β-dihydroxy-6β-methylandrostane-3,17-dione 3,17-bis-(ethylene ketal) of the melting point 185 to 190 degrees centigrade. A sample, recrystallized from dilute acetone, ether-Skellysolve B and finally methylene chloride-Skellysolve B hexanes, had a melting point of 190 to 192 degrees centigrade and rotation $[\alpha]_D$ of minus 31 degrees in chloroform.

Analysis.—Calcd. for $C_{24}H_{38}O_6$: C, 68.22; H, 9.07. Found: C, 68.37; H, 9.42.

*Example 3*

Substituting in Example 2 for the methyl magnesium bromide:

(a) Ethyl magnesium bromide yields 5α,11β-dihydroxy-6β-ethylandrostane-3,17-dione 3,17-bis-(ethylene ketal);

(b) Propyl magnesium iodide yields 5α,11β-dihydroxy-6β-propylandrostane-3,17-dione 3,17-bis-(ethylene ketal);

(c) Isopropyl magnesium bromide yields 5α,11β-dihydroxy-6β-isopropylandrostane-3,17-dione 3,17-bis-(ethylene ketal);

(d) Butyl magnesium bromide yields 5α,11β-dihydroxy-6β-butylandrostane-3,17-dione 3,17-bis-(ethylene ketal);

(e) Pentyl magnesium bromide yields 5α,11β-dihydroxy-6β-pentylandrostane-3,17-dione 3,17-bis-(ethylene ketal);

(f) Hexyl magnesium bromide yields 5α,11β-dihydroxy-6β-hexylandrostane-3,17-dione 3,17-bis-(ethylene ketal);

(g) Phenyl calcium iodide yields 5α,11β-dihydroxy-6β-phenylandrostane-3,17-dione 3,17-bis-(ethylene ketal).

In the same manner as shown in Examples 2 and 3, the 6-alkyl and 6-aryl-5α,11β-dihydroxyandrostane-3,17-dione 3,17-bis-ketals can be prepared from the 5,6-oxido-11β-hydroxyandrostane-3,17-dione 3,17-bis-ketals in which the alkylene group may be 1,2-propylene, 1,3-propylene, 1,2-butylene, 2,3-butylene, and the like.

*Example 4.—5α,11β-dihydroxy-6β-methylandrostane-3,17-dione*

A solution of 3.74 grams of 5α,11β-dihydroxy-6β-methylandrostane-3,17-dione 3,17-bis-(ethylene ketal), dissolved in ninety milliliters of acetic acid and thirty milliliters of water, was warmed on a steam bath for a period of forty minutes and thereupon poured under stirring onto 360 grams of cracked ice. To this mixture seventy grams of sodium bicarbonate was carefully added, portionwise, and the insoluble product, thus obtained, was recovered by filtration, washed well with water and dried to give 260 grams of crude 5α,11β-dihydroxy-6-methylandrostane-3,17-dione (88 percent yield). Recrystallization of the crude material gave a pure 5α,11β-dihydroxy-6β-methylandrostane-3,17-dione of melting point 230 to 235 degrees (with decomposition) and rotation $[\alpha]_D$ plus 66 degrees in ethanol.

Analysis.—Calcd. for $C_{20}H_{30}O_4$: C, 71.83; H, 9.04. Found: C, 71.53; H, 8.97.

In the same manner given in Example 4, hydrolyzing with aqueous acetic acid, or an ethanolic aqueous mineral acid such as hydrochloric acid, sulfuric acid in low concentration e. g. as two to five percent solution in aqueous alcohol other 5α,11β-dihydroxy-6β-alkyl- or 5α,11β-dihydroxy-6β-arylandrostane-3,17-dione 3,17-bis(alkylene ketals) yields the corresponding 5α,11β-dihydroxy-6β-alkylandrostane-3,17-diones or the corresponding 5α,11β-dihydroxy-6β-arylandrostane-3,17-diones. Representative 5α,11β-dihydroxy-6β-alkylandrostane-3,17-diones or the 6-aryl anologues thereof comprise: 5α,11β-dihydroxy-6β-ethylandrostane-3,17-dione, 5α,11β-dihydroxy-6β-propylandrostane-3,17 - dione, 5α,11β-dihydroxy-6β-isopropylandrostane-3,17-dione, 5α,11β-dihydroxy-6β-butylandrostane-3,17-dione, 5α,11β-dihydroxy-6β-isobutylandrostane-3,17-dione, 5α,11β - dihydroxy-6β-pentylandrostane-3,17-dione, 5α,11β-dihydroxy-6β-hexylandrostane-3,17-dione, 5α,11β-dihydroxy-6β-phenylandrostane-3,17-dione, and the like.

*Example 5.—3-(N-pyrrolidinyl)-6-methyl-11β-hydroxy-3,5-androstadien-17-one*

One hundred milligrams of 5α,11β-dihydroxy-6β-androstane-3,17-dione, dissolved in two milliliters of hot methanol, was treated with 0.1 milliliter of pyrrolidine. The enamine began to precipitate and after cooling to room temperature (twenty to thirty degrees centigrade), the mixture was refrigerated to zero degrees in an ice bath. The product which precipitated was recovered by filtration, the precipitate was washed with cold methanol and dried. The yield was 99 milligrams (ninety percent) of 3-(N-pyrrolidinyl)-6-methyl-11β-hydroxy-3,5-androstadien-17-one of melting point 175 degrees with decomposition and rotation $[\alpha]_D$ of minus 69 degrees in chloroform.

Analysis.—Calcd. for $C_{24}H_{35}NO_2$: C, 78.01; H, 9.55; N, 3.79. Found: C, 77.70; H, 9.37; N, 3.75.

Substituting for the pyrrolidine in Example 5, morpholine, piperidine or homomorpholine yields the corresponding 3-(N-cyclic tertiaryamino)-6-methyl-11β-hydroxy-3,5-androstadien-17-one wherein the tertiaryamino group is morpholinyl, piperidinyl, or homomorpholinyl.

In the same manner given in Example 5, using 5α,11β-dihydroxy-6β-alkyl- or 6β-arylandrostane-3,17-diones with pyrrolidine, piperidine, morpholine, or homomorpholine gives the corresponding 3-(N-cyclic tertiaryamino)-6-alkyl-11β-hydroxy-3,5-androstadien-17-one and 3-(N-cyclic tertiaryamino)-6-aryl-11β-hydroxy-3,5-androstadien-17-one, wherein the alkyl groups may be ethyl, propyl, isopropyl, butyl, pentyl, hexyl, or the like, and the aryl group might be phenyl or the like, and the cyclic tertiary-amino radical may be morpholinyl, homomorpholinyl, pyrrolidinyl, or piperidinyl.

*Example 6.—6α,17α-dimethyl-11β-hydroxytestosterone*

A solution was prepared containing 2.43 grams of 3-(N-pyrrolidinyl)-6-methyl-11β-hydroxy-3,5 - androstadien-17-one in sixty milliliters of dry tetrahydrofuran. This solution was added during ten minutes with mechanical stirring in a nitrogen atmosphere to 33 milliliters of a four molar methylmagnesium bromide solution in diethyl ether. The mixture was heated and the solvent distilled until the vapor temperature was 58 degrees at which point the mixture was heated at reflux for seventeen and one-half hours. The heat source was then replaced with an ice bath and, while stirring, the cooled mixture was carefully treated dropwise with fifty milliliters of water. Thereafter seventeen milliliters of acetic acid and fifty milliliters of methanol was added and the mixture was stirred and warmed until all solids were dissolved. Then a solution of two normal sodium hydroxide was added under stirring until the mixture had a pH between eight and nine as shown by testing with pH paper. At this point, the mixture was heated at reflux for twenty minutes. Acetic acid was added dropwise until the pH of the mixture was five to six and it was then concentrated in vacuo to remove about sixty and seventy milliliters of solvent. A solid product separated upon cooling and was recovered by filtration. The precipitate was washed with dilute hydrochloric acid and water and dried to give 1.71 grams of 6α,17α-dimethyl-11β-hydroxytestosterone which upon recrystallization from dilute methanol, and then ethyl acetate had a melting point of 225 to 228 degrees centigrade; rotation $[\alpha]_D$ plus 86 degrees in 95 percent ethanol, $\lambda^{ethanol}_{maximum}$ 242 millimicrons ($A_M$ 14,800)

Analysis.—Calcd. for $C_{21}H_{32}O_3$: C, 75.85; H, 9.70. Found: C, 75.51; H, 9.75.

Example 7.—6α-methyl-17α-ethyl-11β-hydroxytestosterone

In the same manner given in Example 6, treating 3-(N-pyrrolidinyl)-6-methyl-11β-hydroxy-3,5-androstadien-17-one with ethylmagnesium iodide in tetrahydrofuran gives 3-(N-pyrrolidinyl)-6-methyl-17α-ethyl-11β,17β-dihydroxy-3,5-androstadiene which after hydrolysis with a base such as sodium or potassium hydroxide yields the 6α-methyl-17α-ethyl-11β-hydroxytestosterone.

In the same manner as given in Examples 6 and 7, other 6α,17α-dialkyl-11β-hydroxytestosterones are prepared by treating the corresponding 3-(N-cyclic tertiaryamino)-6-alkyl- or respectively the 3-(N-cyclic tertiaryamino)-6-aryl-11β-hydroxy-3,5-androstadien-17-one with an alkylating or arylating reagent such as methyl, ethyl, propyl, isopropyl, butyl, pentyl, hexyl, phenyl Grignards, decomposing the thus produced organic metal complex compounds under essentially neutral conditions and hydrolyzing in a basic medium the thus obtained 3-(N-cyclic tertiaryamino)-6,17α-dialkyl-11β,17β-dihydroxy-3,5-androstadiene or, respectively, the 3-(N-cyclic tertiaryamino)-6,17-disubstituted 11β,17β-dihydroxy-3,5-androstadiene wherein the 6 and 17 positions are substituted by alkyl groups such as methyl, ethyl, propyl, isobutyl, and the like, or aryl groups such as phenyl, benzyl, or the like, to obtain the corresponding 6,17-disubstituted 11β-hydroxytestoterone. Representative compounds thus obtained comprise: 6α,17α-diethyl-11β-hydroxytestosterone, 6α,17α-dipropyl-11β-hydroxytestosterone, 6α-methyl-17α-butyl-11β-hydroxytestosterone, 6α-methyl-17α-phenyl-11β-hydroxytestosterone, 6α-methyl-17α-phenyl-11β-hydroxytestosterone, 6α,17α-diphenyl-11β-hydroxytestosterone, and the like.

Example 8.—6α,17α-dimethyl-11-ketotestosterone

One half gram (500 milligrams) of 6,17-dimethyl-11β-hydroxytestosterone was dissolved in five milliliters of acetic acid and thereto was added a solution of 0.2 gram of chromic anhydride in 0.5 milliliter of water and two milliliters of acetic acid. The mixture was allowed to stand at room temperature with occasional shaking for a period of four hours whereafter was added one milliliter of methanol and thereupon the mixture was poured into fifty milliliters of ice water. After neutralization of the aqueous solution with sodium bicarbonate, a precipitate formed and was collected by filtration. The precipitate was washed with water and thereupon dried and recrystallized twice from aqueous methanol and once from ethyl acetate to give pure 6α,17α-dimethyl-11-ketotestosterone.

Example 9.—6α-methyl-17α-ethyl-11-ketotestosterone

In the same manner given in Example 8, oxidizing 6α-methyl-17α-ethyl-11β-hydroxytestosterone with chromic anhydride in acetic acid produces the 6α-methyl-17α-ethyl-11-ketotestosterone.

In the same manner shown in Examples 8 and 9, other 6,17-disubstituted 11-ketotestosterones wherein the 6 and 17 position is substituted by alkyl or aryl such as methyl, ethyl, propyl, isopropyl, butyl, isobutyl, pentyl, hexyl, or aryl, like phenyl, benzyl or the like, are prepared from the corresponding 6,17-disubstituted 11β-hydroxytestosterone by oxidation with chromic acid.

Example 10.—6α,17α-dimethyl-11-ketotestosterone 17β-acetate

To a solution of 0.2 gram of 6α,17α-dimethyl-11-ketotesterone in two milliliters of pyridine was added one milliliter of acetic anhydride. The mixture was heated for eighteen hours on the water bath, thereupon cooled, diluted with water and extracted with three ten-milliliter portions of methylene chloride. The methylene chloride extracts were combined, dried over anhydrous sodium sulfate, evaporated and the thus obtained residue recrystallized twice from methanol and once from Skellysolve B hexanes-acetone to give 6α,17α-dimethyl-11-ketotestosterone 17β-acetate.

In the same manner as shown in Example 10, other esters of 6α,17α-dimethyl-11-ketotestosterone may be prepared by heating the steroid with the corresponding acid anhydride at temperatures between eighty degrees centigrade and the reflux temperature of the mixture. Representative esters of 11-ketotestosterone disubstituted in the six and seventeen position by alkyl or aryl groups such as methyl, ethyl, propyl, isopropyl, butyl, pentyl, hexyl, phenyl, or the like, comprise the 17-propionate, butyrate, valerate, hexanoate, heptanoate, octanoate, phenylacetate, phenylpropionate, or the like, of 6,17-dimethyl-11-ketotestosterone, 6α,17α-diethyl-11-ketotestosterone, 6α,17α-diphenyl-11-ketotestosterone, and other 6- and 17-dialkyl and diaryl substituted 11-ketotestosterones.

Example 11.—6α-methyl-11β-hydroxy-4-androstene-3,17-dione

Two hundred milligrams of 3-(N-pyrrolidinyl)-6-methyl-11β-hydroxy-3,5-androstadien-17-one (Example 5) and five milliliters of 95 percent ethanol was heated at reflux for eighty minutes. While boiling, the mixture was diluted with ten milliliters of hot water and cooled. The product which separated in the form of needles was recovered, washed with water and dried and thereupon recrystallized from dilute acetone to give pure 6-methyl-11β-hydroxy-4-androstene-3,17-dione of melting point 230 to 233 degrees centigrade, rotation $[\alpha]_D$ plus 169 degrees in 95 percent ethanol.

Analysis.—Calcd. for $C_{20}H_{28}O_3$: C, 75.92; H, 8.92. Found: C, 75.72; H, 8.79.

In the same manner hydrolyzing a 3-(N-cyclic tertiaryamino)-6-alkyl-11β-hydroxy-3,5-androstadien-17-one or a 3-(N-cyclic tertiaryamino)-6-aryl-11β-hydroxy-3,5-androstadien-17-one produces the corresponding 6-alkyl- or 6-aryl-11β-hydroxy-4-androstene-3,17-dione. Representative compounds obtained by this method comprise 6-ethyl-11β-hydroxy-4-androstene-3,17-dione, 6-propyl-11β-hydroxy-4-androstene-3,17-dione, 6-isopropyl-11β-hydroxy-4-androstene-3,17-dione, 6-butyl-11β-hydroxy-4-androstene-3,17-dione, 6-pentyl-11β-hydroxy-4-androstene-3,17-dione, 6-hexyl-11β-hydroxy-4-androstene-3,17-dione, 6-phenyl-11β-hydroxy-4-androstene-3,17-dione, and the like.

Example 12.—6-methyladrenosterone (6-methyl-4-androstene-3,11,17-trione)

To a mixture of two hundred milligrams of 6α-methyl-11β-hydroxy-4-androstene-3,17-dione in two milliliters of acetic acid was added one hundred milligrams of chromic anhydride, dissolved in one milliliter of acetic acid containing 0.2 milliliter of water. The mixture was allowed to stand at room temperature (about 25 degrees centigrade) for a period of three hours and was thereafter diluted with ten milliliters of water and after thirty minutes filtered. The precipitate obtained, recovered by filtration, was recrystallized twice from aqueous methanol and once from acetone-Skellysolve B hexanes to give 6-methyladrenosterone.

In the same manner shown in Example 12, oxidizing other 6-alkyl-11β-hydroxy-4-androstene-3,17-dione or 6-aryl-11β-hydroxy-4-androstene-3,17-dione produces the corresponding 6-alkyl- or 6-aryladrenosterones wherein the alkyl group may be methyl, ethyl, propyl, isopropyl, butyl, pentyl, hexyl, or an aryl such as phenyl, benzyl, or the like.

*Example 13.* — *6α,17α-dimethyl-9α-fluoro-11β,17β-dihydroxy-4-androstene-3-one (6α,17α - dimethyl-9α-fluoro-11β-hydroxytestosterone)*

To a solution of two grams of 6α,17α-dimethyl-11β-hydroxytestosterone in twelve milliliters of pyridine was added 1.5-grams of N-bromoacetamide. After standing at room temperature (about 23 to 25 degrees centigrade) for a period of fifteen minutes, the reaction solution was cooled to five to ten degrees centigrade and with shaking sulfur dioxide gas was passed over the surface until the solution gave no color with acidified starch-iodine paper. During the addition of sulfur dioxide gas the reaction became warm. The temperature was kept under thirty degrees centigrade by external cooling and by varying the rate of sulfur dioxide addition. Thereafter to the reaction mixture 100 milliliters of ice water was added and the resulting precipitate collected by filtration. This material was repeatedly recrystallized from acetone-Skellysolve B hexanes to give 6α,17α-dimethyl-17β-hydroxy-4,9(11)-androstadien-3-one.

To a solution of 1.5 grams of the thus obtained 6α,17α-dimethyl-17β-hydroxy-4,9(11)-androstadien-3-one in 25 milliliters of methylene chloride and 75 milliliters of tertiary butyl alcohol was added a solution of four milliliters of 72 percent perchloric acid in 25 milliliters of water, followed by a solution of 0.6 gram of N-bromoacetamide in fifteen milliliters of tertiary butyl alcohol. After stirring the reaction mixture for fifteen minutes a solution of 0.7 gram of sodium sulfite in forty milliliters of water was added and the reaction mixture was concentrated to a volume of about 125 milliliters under reduced pressure at about fifty degrees centigrade. After crystallization had started, the concentrate was cooled in an ice bath and while stirring 125 milliliters of water was added. After stirring for a period of one hour, the crystalline product was isolated by filtration, the crystals were washed with water, air dried and recrystallized from methanol to give 6α,17α-dimethyl-9α-bromo-11β,17β-dihydroxy-4-androsten-3-one.

To a solution of 1.4 grams of 6α,17α-dimethyl-9α-bromo-11β,17β-dihydroxy-4-androsten-3-one in 35 milliliters of acetone was added 1.4 grams of potassium acetate and the resulting suspension was heated under reflux for a period of eighteen hours. The mixture was then concentrated to approximately twelve milliliters of volume at reduced pressure on the steam bath and thereupon diluted with water and extracted with methylene chloride. The methylene chloride extracts were combined, washed with water, dried over anhydrous sodium sulfate and evaporated. The residue was redissolved in methylene chloride and chromatographed over forty grams of Florisil anhydrous magnesium silicate. The column was eluted with 250 milliliters of five percent acetone-95 percent Skellysolve B hexanes, 400 milliliters of eight percent acetone-92 percent Skellysolve B hexanes, 700 milliliters of ten percent acetone-ninety percent Skellysolve B and 100 milliliters of acetone. The eluant was collected in 100-milliliter fractions. Fractions 6 through 16 contained the desired 6α,17α-dimethyl-9β,11β-oxido-17β-hydroxy-4-androsten-3-one.

To approximately 2.5 grams of hydrogen fluoride and 4.5 milliliters of tetrahydrofuran contained in a polyethylene bottle and maintained at minus sixty degrees centigrade a solution of one gram of 6α,17α-dimethyl-9β,11β-oxido-17β-hydroxy-4-androsten-3-one in four milliliters of methylene chloride was added. The light red colored solution was kept at approximately minus thirty degrees centigrade for one hour and then for two hours at minus ten degrees centigrade. At the end of this period it was mixed cautiously with an excess of cold sodium bicarbonate solution and the organic material extracted with the aid of additional methylene chloride. The combined extracts were washed with water, dried over anhydrous sodium sulfate, and concentrated to approximately one hundred milliliters of volume. This solution was chromatographed over eighty grams of Florisil anhydrous magnesium silicate. The column was eluted with 800 milliliters of seven percent acetone-93 percent Skellysolve B hexanes, 1000 milliliters of ten percent acetone-ninety percent Skellysolve B hexanes, 2000 milliliters of twelve percent acetone-88 percent Skellysolve B hexanes, and 200 milliliters of acetone. The eluant was collected in 200 milliliter fractions and fractions 11 through 17 were combined and evaporated to give a residue which was twice recrystallized from aqueous methanol to give pure 6α,17α-dimethyl-9α-fluoro-11β,17β-dihydroxy-4-androsten-3-one of melting point 279–281 degrees centigrade and rotation $[\alpha]_D$ plus 83 degrees in 95 percent ethanol.

*Analysis.*—Calcd. for $C_{21}H_{31}FO_3$: C, 71.96; H, 8.92; F, 5.42. Found: C, 71.63; H, 8.75; F, 6.02.

The thus obtained 6α,17α-dimethyl-9α-fluoro-11β,17β-dihydroxy-4-androsten-3-one has a high anabolic activity having only a trace of androgenic activity, and is therefore a material of choice to be used in the symptomatic treatment of diseases where the protein anabolic activity should be increased while the androgenic activity is undesired.

*Example 14.*—*6α,17α-dimethyl-17β-hydroxy-9α-fluoro-4-androstene-3,11-dione (6α,17α - dimethyl-9α-fluoro-11-ketotestosterone)*

A mixture was prepared containing in ten milliliters of acetic acid, 0.5 gram of 6α,17α-dimethyl-9α-fluoro-11β,17β-dihydroxy-4-androsten-3-one. To the thus obtained solution was then added 0.3 gram of chromic anhydride dissolved in two milliliters of acetic acid and one milliliter of water. The thus obtained reaction mixture was thereupon allowed to stand at room temperature for a period of five hours whereupon one milliliter of methanol was added. The mixture was then stirred, diluted with 75 milliliters of water, and allowed to stand in the refrigerator for a period of eighteen hours. Thereafter a precipitate was collected by filtration and three times recrystallized from aqueous acetone to give pure 6α,17α-dimethyl-17β-hydroxy-9α-fluoro-4-androstene-3,11 - dione (6α,17α-dimethyl-9α-fluoro-11-ketotestosterone) of melting point 177–180 degrees centigrade and rotation $[\alpha]_D$ plus 110 degrees in 95 percent ethanol.

*Analysis.*—Calcd. for $C_{21}H_{29}FO_3$: C, 72.39; H, 8.39; F, 5.45. Found: C, 72.35; H, 8.69; F, 5.85.

The thus obtained 6α,17α-dimethyl-9α-fluoro-11-ketotestosterone was found to have a high anabolic activity with low androgenic activity and is useful for the same purposes as the 6α,17α-dimethyl-9α-fluoro-11β,17β-dihydroxy-4-androsten-3-one produced in Example 13.

It is to be understood that the invention is not to be limited to the exact details of operation or exact compounds shown and described herein, as obvious modifications and equivalents will be apparent to one skilled in the art, and the invention is therefore to be limited only by the scope of the appended claims.

We claim:

1. A compound selected from the group consisting of 6,17α-dimethyl-11β,17β-dihydroxy-4-androsten-3-one, 6,17α-dimethyl-17β-hydroxy-4-androstene-3,11-dione and 6,17α-dimethyl-17β-hydroxy-4-androstene-3,11-dione 17β-acylate wherein the acyl group is of a hydrocarbon carboxylic acid containing from one to eight carbon atoms, inclusive.

2. 6α,17α - dimethyl-11β,17β-dihydroxy-4-androsten-3-one.

3. 6α,17α - dimethyl-17β-hydroxy-4-androstene-3,11-dione.

4. A process for the production of 6α-methyl-17α-alkyl-11β,17β-dihydroxy-4-androsten-3-one, wherein the alkyl group has from one to six carbon atoms, inclusive, which comprises treating 5α,11β-dihydroxy-6β-methylandrostane-3,17-dione with a cyclic secondary amine of the formula:

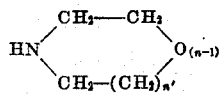

wherein *n* and *n'* are integer numbers from one to two inclusive to obtain the corresponding 3-(N-cyclic tertiaryamino) - 6 - methyl-11β-hydroxy-3,5-androstadien-17-one; treating the thus produced 3-(N-cyclic tertiaryamino)-6-methyl-11β-hydroxy-3,5-androstadien-17-one with an alkyl Grignard reagent wherein the alkyl group has from one to six carbon atoms, inclusive, to obtain 3-(N-cyclic tertiaryamino) - 6 - methyl-17α-alkyl-11β,17β-dihydroxy-3,5-androstadiene, and hydrolyzing the thus obtained 3-(N - cyclic tertiaryamino)-6-methyl-17α-alkyl-11β,17β-dihydroxy-3,5-androstadiene with a base to obtain the corresponding 6α-methyl-17α-alkyl-11β-hydroxytestosterone.

5. A process for the production of 6α,17α-dimethyl-11β,17β-dihydroxy-4-androsten-3-one which comprises treating 5α,11β-dihydroxy-6β-methylandrostene-3,17-dione with a cyclic secondary amine of the formula:

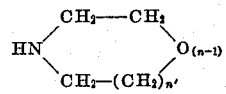

wherein *n* and *n'* are integer numbers from one to two, inclusive, to obtain the corresponding 3-(N-cyclic tertiaryamino) - 6 - methyl-11β-hydroxy-3,5-androstadien-17-one; treating the thus produced 3-(N-cyclic tertiaryamino)-6-methyl-11β-hydroxy - 3,5 - androstadiene-17-one with a methyl magnesium Grignard reagent to obtain 3-(N-cyclic tertiaryamino) - 6,17α-dimethyl-11β,17β-dihydroxy-3,5-androstadiene, hydrolyzing the thus obtained 3-(N-cyclic tertiaryamino) - 6,17α-dimethyl-11β,17β-dihydroxy-3,5-androstadiene with a base to obtain the corresponding 6α,17α-dimethyl-11β-hydroxytestosterone.

6. A process for the production of 6α-methyl-17α-alkyl-11-ketotestosterone, wherein the alkyl group has from one to six carbon atoms, inclusive, which comprises: treating 5α,11β-dihydroxy-6β-methylandrostane-3,17-dione with a secondary cyclic amine of the formula:

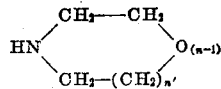

wherein *n* and *n'* are integer numbers from one to two, inclusive, to obtain the corresponding 3-(N-cyclic tertiaryamino)-11β-hydroxy-3,5-androstadien-17-one; treating the thus obtained 3-(N-cyclic tertiaryamino)-6-methyl-11β-hydroxy-3,5-androstadien-17-one with an alkyl magnesium Grignard wherein the alkyl group has from one to six carbon atoms, inclusive, to obtain the corresponding 3-(N - cyclic tertiaryamino)-6-methyl-17α-alkyl-11β,17β-dihydroxy-3,5-androstadiene; hydrolyzing the thus obtained 3-(N-cyclic tertiaryamino) - 6 - methyl-17α-alkyl-11β,17β-dihydroxy-3,5-androstadiene to obtain the corresponding 6α-methyl-17α-alkyl - 11β - hydroxytestosterone and oxidizing the thus obtained 6α-methyl-17α-alkyl-11β-hydroxytestosterone to obtain the corresponding 6α-methyl-17α-alkyl-11-ketotestosterone.

7. A process for the production of 6α,17α-dimethyl-11-ketotestosterone which comprises: treating 5α,11β-dihydroxy-6β-methylandrostane-3,17-dione with a secondary cyclic amine of the formula:

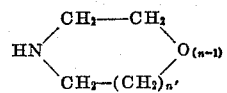

wherein *n* and *n'* are integer numbers from one to two, inclusive, to obtain the corresponding 3-(N-cyclic tertiaryamino)-11β-hydroxy-3,5-androstadien-17-one; treating the thus obtained 3-(N-cyclic tertiaryamino)-6-methyl-11β-hydroxy-3,5-androstadien-17-one with a methyl magnesium Grignard to obtain the corresponding 3-(N-cyclic tertiaryamino) - 6,17α - dimethyl-11β,17α-dihydroxy-3,5-androstadiene; hydrolyzing the thus obtained 3-(N-cyclic tertiaryamino) - 6,17α - dimethyl-11β,17β-dihydroxy-3,5-androstadiene to obtain the corresponding 6α,17α-dimethyl-11β-hydroxytestosterone, and oxidizing with chromic acid the thus obtained 6α,17α-dimethyl-11β-hydroxytestosterone to obtain the corresponding 6α,17α-dimethyl-11-ketotestosterone.

No references cited.

UNITED STATES PATENT OFFICE
Certificate of Correction

Patent No. 2,842,572                  July 8, 1958

Milton E. Herr et al.

It is hereby certified that error appears in the printed specification of the above numbered patent requiring correction and that the said Letters Patent should read as corrected below.

Column 9, lines 37 and 38, for "6α-methyl-17α-phenyl-11β-hydroxytestosterone," read —6α-methyl-17α-hexyl-11β-hydroxytestosterone,—.

Signed and sealed this 19th day of May 1959.

[SEAL]

Attest:
KARL H. AXLINE,
*Attesting Officer.*

ROBERT C. WATSON,
*Commissioner of Patents.*